Patented Aug. 11, 1953

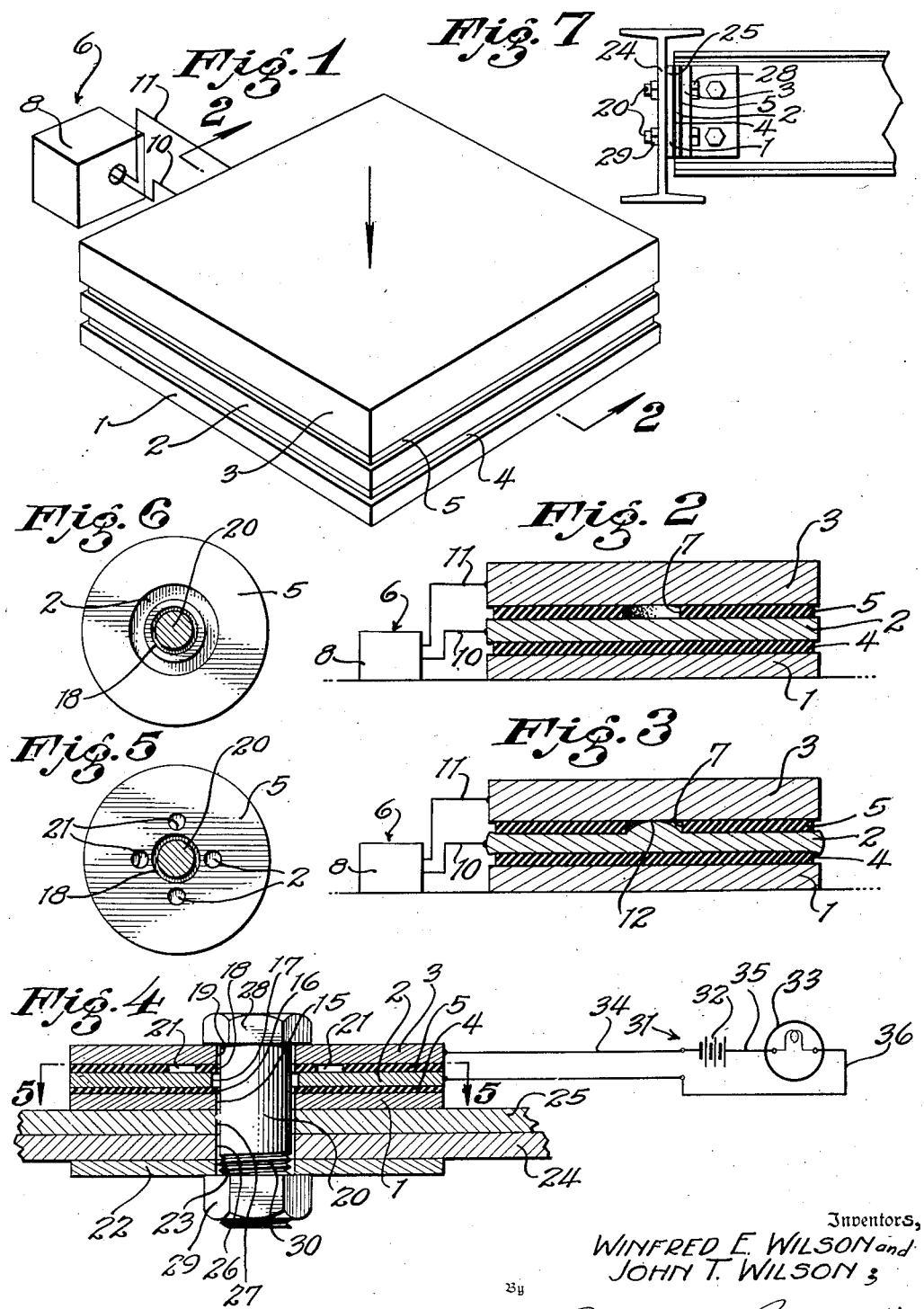

2,648,833

UNITED STATES PATENT OFFICE 2,648,833

MEANS FOR MEASURING TENSION IN BOLTS

Winfred E. Wilson, Los Angeles, and
John T. Wilson, San Marino, Calif.

Application April 5, 1951, Serial No. 219,413

2 Claims. (Cl. 340—213)

This invention relates to apparatus for measuring loads, such as the tension in a bolt holding two or more plates in compressive engagement.

The general object of the invention is to provide a means of the character stated by which a load may be measured by the flow of a metal upon applying a compressive stress to said metal.

A more particular object is to provide an apparatus for measuring the load of an object from which rivets are eliminated, and bolts are substituted therefor, and the load is determined by the tension of the bolts and indicated on a measuring instrument.

Another object is to provide an apparatus for measuring loads of a building without the necessity of boring holes in the building construction.

Another object is to provide a measuring apparatus for a structure including plates and a bolt for holding said plates together under pressure, by means of which apparatus the tension in said bolt or the pressure between said plates may be measured.

A further object is to provide a measuring apparatus for a structure including a pair of plates and a bolt for holding said plates together under bolt tension, by means of which apparatus the frictional resistance of the two plates can be determined by determining the tension in said bolt.

Other objects and advantages will appear hereinafter as this specification progresses.

The invention consists in the novel features of construction, combinations of elements and arrangements of parts, hereinafter more fully described in this specification and pointed out in the claims.

The invention is illustrated in the annexed drawing, which forms a part of this specification, and in which:

Figure 1 is a fragmentary perspective view of our invention;

Figure 2 is a transverse vertical section of our invention taken on line 2—2 of Figure 1, showing our invention in position before a load is applied thereto, Figure 3 is a view like Figure 2, but showing our invention in the position it assumes in measuring a load when applied thereto.

Figure 4 is a transverse vertical section of a modification of our invention,

Figure 5 is a horizontal section of said modification of our invention taken on line 5—5 of Figure 4, Figure 6 is a horizontal section of said modification of our invention taken on line 6—6 of Figure 4, and, Figure 7 is a view illustrative of a use of the invention between two girders.

Referring more particularly to the drawing, in which the same parts are designated by the same reference numerals in all of the views, our invention includes primarily a lower plate 1 of strong and hard metal, an intermediate plate 2 of relatively soft metal; an upper plate 3 of strong hard and relatively thick metal; a plate 5 of insulation interposed between the lower plate 1 and the intermediate plate 2; an insulation plate 5 interposed between the intermediate plate 2 and the upper plate 3; and a signal device 6 for the purpose hereinafter more fully described.

The insulation plate 5 is provided with a central opening 7 therein for the purpose hereinafter more fully described.

The signal device 6 may comprise a box 8 enclosing a battery and a signal, such as an electric bell (not shown) and to the terminals of which battery are connected one end of each of two wires 10 and 11, respectively, the other ends of said wires being connected to the intermediate plate 2 and the upper plate 3, respectively, while the signal in the box 6 may be connected to the battery in the conventional manner.

The operation, uses and advantages of our invention as above described, are as follows:

The load, such as a column or the corner of a building, is first placed upon the upper plate 3, but the load is normally not heavy enough to operate the signal in the signal box to sound the signal in said box. When the weight of the load increases above a predetermined point, the pressure of the load upon the plate 3, insulation plate 5 and soft metal plate 2, upsets the soft metal of said soft-metal plate in the opening 7 in plate 5 and causes said soft metal to flow upwardly in said opening 7 until said soft metal contacts the under side of the hard metal plate 3, as shown at 12, and closes the signal circuit, as shown in Figure 3 of the drawing, whereupon electric current passes from one terminal of the battery in the signal box 6 through wire 10, soft metal plate 2, contact 12 between plates 2 and 3 and through plate 3 and wire 11 back to the other terminal of said battery, closing the signal circuit, and sounding the signal in the signal box 8.

In the modification of our invention shown in Figures 4, 5, 6 and 7, the construction is the same as that shown in Figures 1 to 3, inclusive, except that the plates 1, 2, 3, 4, and 5 are provided with central bolt openings 15, 16, 17, 18 and 19, respectively, to receive a bolt 20; a plurality of openings 21 are provided in the insulation plate 5 spaced around the bolt opening 18 in said plate 5; a washer 22 is provided with a central opening 23; a pair of plates 24 and 25 are provided with central openings 26 and 27, respectively, with the lower plate 24 resting upon the washer 22, and the plate 25 resting upon the plate 24, and with the plate 1 resting upon the plate 25, with the bolt 20 extending downwardly through the openings 19, 18, 17, 16, 15, 27, 26, and 23 in the plates 3, 5, 2, 4, 1, 25 and 24, and washer 22, respectively, with the bolt head 28 resting upon the plate 3 and a nut 29 threaded on the lower threaded end 30 of said bolt 20 against the lower side of the washer 22 and a signalling circuit 31, including a battery 32, a bell or light bulb 33, a lead 34 extending from the upper plate 3 to one terminal of said battery 32, a lead 35 extending from the other terminal of said battery to one terminal of said signalling instrument 33, and a lead 36 extending from the other terminal of said instrument 33 to the soft metal plate 2.

The operation, uses and advantages of the modification of our invention shown in Figures 4, 5 and 6 of the drawing, are as follows:

To place a predetermined tension in the bolt 20, the nut 29 is turned to the right on the threaded lower end 30 of the bolt 20 against the lower side of the washer 22, so that the head 28 of said bolt will engage the upper side of the plate 3 and draw said plate downwardly, and whereupon said plates 24, 25, 1, insulation plates 4 and 5, and the soft metal plate 2 are brought under pressure between the upper plate 3 and washer 22, and during such pressure against the soft metal plate 2, said plate is upset and the soft metal of said plate is caused to flow upwardly in the openings 21 in the insulation plate 2, until said upset soft metal contacts with the under side of the hard metal plate 3 and closes the circuit 31 to operate the signal 33 which indicates that a predetermined bolt tension has been reached.

The insulation plates 4 and 5 may be formed of a treated paper, the commercially known "Empire" cloth, or of other material. The plate 2 will vary as to composition, and may be aluminum or an alloy thereof. Three variables are introduced in the practice of the invention, to wit: the thickness of the insulation plate 5, the diameter of the holes 21 in said plate, and the character of the material for plate 2.

By way of example, plate 2, which is to flow through opening 21 and make contact with plate 3 when a tensile stress of 5520 pounds is imposed on the bolt, may utilize an insulation plate 5, of .004 inch in thickness, having holes 21 passed therethrough of .25 inch, the plate 2 being of aluminum, having a thickness of .022 inch, and a hardness ratio of 4S. Thus, when the tensile stress on the bolt has reached 5520 pounds, plate 2 has been compressed so as to force a portion thereof through the holes 21, to complete an electrical circuit and operate the signalling device.

In Figure 7, an adaptation of the invention is shown, wherein two girders are connected by bolts 20 passed through the web of one girder and the flange of an angle section member carried by the web of the other girder. The parts of the girders bear the same numbers of reference as appear in Figure 4. When the desired bolt tension has been reached, the signal indicator 33 is operated. The members 2, 4 and 5 remain in the position shown and the flange of the angle section and the web of the girder are in compressive engagement therewith. Hence, the bolt is always in tension and no shear stress is imposed thereon.

We claim:

1. In a measuring apparatus as disclosed, a lower plate, an upper plate, an intermediate soft metal plate, a plate of insulation between said lower plate and said intermediate plate, a second plate of insulation between said intermediate plate and said upper plate, a signal circuit connected to said soft metal plate and to said upper metal plate, said second insulation plate being provided with an opening therein through which opening the soft metal in said intermediate soft metal plate is upset through said opening in said insulation plate in contact with said upper metal plate, for closing said signal circuit to operate a signal, under a predetermined load applied to said upper metal plate.

2. In a measuring apparatus as disclosed, a lower plate, an upper plate, an intermediate plate of soft metal, a plate of insulation between said lower plate and said intermediate soft metal plate, a second plate of insulation between said intermediate plate and said upper plate, a washer, a pair of plates placed adjacent each other between said lower plate and said washer, all of said plates and said washer being provided with aligned openings, respectively, a bolt extending through said aligned openings with the head of said bolt resting against the upper side of said upper plate, and a nut threaded on the lower end of said bolt against the lower side of said washer, a measuring circuit connected to said soft metal plate and to said upper plate, said second intermediate insulation plate being provided with another opening therein through which the soft metal of said soft-metal plate is upset into contact with said upper metal plate, for closing said measuring circuit, upon turning said nut against the under side of said washer and drawing said plates, except the upper plate, together between said washer and said upper plate, for indicating the tension in said bolt and the pressure between said pair of plates.

WINFRED E. WILSON.
JOHN T. WILSON.

References Cited in the file of this patent
UNITED STATES PATENTS

| Number | Name | Date |
|---|---|---|
| 2,041,589 | Bowers | May 19, 1936 |
| 2,503,141 | Stone | Apr. 4, 1950 |
| 2,572,940 | Lockhart | Oct. 30, 1951 |